US012699881B2

(12) United States Patent
Ni et al.

(10) Patent No.: US 12,699,881 B2
(45) Date of Patent: Aug. 4, 2026

(54) METHOD, ELECTRONIC DEVICE, AND COMPUTER PROGRAM PRODUCT FOR DETECTING MODEL PERFORMANCE

(71) Applicant: Dell Products L.P., Round Rock, TX (US)

(72) Inventors: Jiacheng Ni, Shanghai (CN); Zijia Wang, WeiFang (CN); Sanping Li, Beijing (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 938 days.

(21) Appl. No.: 17/984,728

(22) Filed: Nov. 10, 2022

(65) Prior Publication Data

US 2024/0134937 A1 Apr. 25, 2024
US 2024/0232295 A9 Jul. 11, 2024

(30) Foreign Application Priority Data

Oct. 21, 2022 (CN) .......................... 202211295555.4

(51) Int. Cl.
*G06N 3/0455* (2023.01)
*G06N 3/045* (2023.01)
(Continued)

(52) U.S. Cl.
CPC .......... *G06N 3/0455* (2023.01); *G06N 3/045* (2023.01); *G06N 3/088* (2013.01); *G06N 3/0895* (2023.01); *G06N 20/00* (2019.01)

(58) Field of Classification Search
CPC ...... G06N 20/00; G06N 3/045; G06N 3/0895; G06N 3/088; G06N 3/0455
See application file for complete search history.

(56) References Cited

U.S. PATENT DOCUMENTS 11,768,917 B2 * 9/2023 Wang ..................... G06N 20/00
706/11
12,019,987 B1 * 6/2024 Yu .......................... G06F 40/30
(Continued)

OTHER PUBLICATIONS

Xu, Yiming, and Diego Klabjan. "Concept Drift and Covariate Shift Detection Ensemble with Lagged Labels." arXiv preprint arXiv:2012.04759 (2020) (Year: 2020).*

(Continued)

*Primary Examiner* — Andrew L Tank
(74) *Attorney, Agent, or Firm* — Ryan, Mason & Lewis, LLP

(57) ABSTRACT

Embodiments of the present disclosure provide a method, an electronic device, and a computer program product for detecting model performance. The method may include acquiring a prediction result of an input feature using a target model to determine a confidence of the prediction result. The method may further include reconstructing the input feature using a self-coding model to determine a reconstruction error, the reconstruction error being a difference between the input feature before being reconstructed by the self-coding model and the input feature after being reconstructed by the self-coding model. In addition, the method may include determining a detection result of the target model at least based on a comparison between the confidence and a first threshold and a comparison between the reconstruction error and a second threshold.

20 Claims, 5 Drawing Sheets

(51) Int. Cl.
| | |
|---|---|
| *G06N 3/088* | (2023.01) |
| *G06N 3/0895* | (2023.01) |
| *G06N 20/00* | (2019.01) |

(56) References Cited

U.S. PATENT DOCUMENTS

| | | | | |
|---|---|---|---|---|
| 12,406,483 | B2 * | 9/2025 | Shim .................... | G06V 10/764 |
| 2016/0155136 | A1 * | 6/2016 | Zhang ..................... | G06N 3/09 |
| | | | | 705/7.29 |
| 2017/0177993 | A1 * | 6/2017 | Draelos .................. | G06N 3/082 |
| 2019/0147357 | A1 * | 5/2019 | Erlandson ............ | G06N 3/0455 |
| | | | | 706/12 |
| 2020/0193313 | A1 * | 6/2020 | Ghanta .................. | G06N 20/00 |
| 2020/0372339 | A1 * | 11/2020 | Che ......................... | G06F 17/18 |
| 2020/0410390 | A1 * | 12/2020 | Fu .......................... | G06F 11/302 |
| 2021/0184958 | A1 * | 6/2021 | Kolar ...................... | H04L 43/14 |
| 2022/0012613 | A1 * | 1/2022 | Datta ...................... | G06N 20/20 |
| 2022/0156578 | A1 * | 5/2022 | Allahdadian .......... | G06N 3/084 |
| 2022/0172050 | A1 * | 6/2022 | Dalli ..................... | G06N 3/0495 |
| 2022/0180204 | A1 * | 6/2022 | Katsuki .................. | G06N 3/045 |
| 2022/0188410 | A1 * | 6/2022 | Allahdadian ....... | G06F 18/2135 |
| 2022/0215289 | A1 * | 7/2022 | Mopur .................... | G06F 18/22 |
| 2022/0230083 | A1 * | 7/2022 | Vishwakarma ....... | G06F 3/0608 |
| 2022/0366280 | A1 * | 11/2022 | Rowe ............... | G06F 18/24147 |
| 2022/0366297 | A1 * | 11/2022 | Pushak .................. | G06N 20/00 |
| 2023/0024884 | A1 * | 1/2023 | Casserini ............... | G06N 3/088 |
| 2023/0252347 | A1 * | 8/2023 | Koulierakis ...... | G03F 7/706841 |
| | | | | 706/10 |
| 2023/0316045 | A1 * | 10/2023 | Rama ................... | G06N 3/0455 |
| | | | | 706/25 |
| 2024/0086704 | A1 * | 3/2024 | Teixeira Nogueira ....................... | |
| | | | | G06T 13/40 |
| 2024/0362472 | A1 * | 10/2024 | Fu ......................... | G06N 3/0464 |
| 2025/0036947 | A1 * | 1/2025 | Zhang .................... | G06N 3/045 |

OTHER PUBLICATIONS

Gheibi, Omid, and Danny Weyns. "Lifelong self-adaptation: Self-adaptation meets lifelong machine learning." Proceedings of the 17th symposium on software engineering for adaptive and self-managing systems. (Aug. 2022) (Year: 2022).*

Zheng, Shihao & Zon, Simon & Pechenizkiy, Mykola & Campos, Cassio & Ipenburg, Werner & Harder, Hennie."Labelless Concept Drift Detection and Explanation.", NeurIPS 2019 Workshop on Robust AI in Financial Services (2019) (Year: 2019).*

Ross, Gordon J., et al. "Exponentially weighted moving average charts for detecting concept drift." Pattern recognition letters 33.2 (2012): 191-198. (Year: 2012).*

Lundberg, Scott M., and Su-In Lee. "A unified approach to interpreting model predictions." Advances in neural information processing systems 30 (2017). (Year: 2017).*

Demšar, Jaka, and Zoran Bosnić. "Detecting concept drift in data streams using model explanation." Expert Systems with Applications 92 (2018): 546-559. (Year: 2018).*

Madireddy, Sandeep, et al. "Adaptive learning for concept drift in application performance modeling." Proceedings of the 48th International Conference on Parallel Processing. 2019. (Year: 2019).*

Forward, Cloudera Fast. "Deep Learning for Anomaly Detection." URL: https://ff12. fastforwardlabs. com/(Last accessed: Nov. 24, 2021). (Year: 2021).*

Suprem, Abhijit, et al. "Odin: Automated drift detection and recovery in video analytics." arXiv preprint arXiv:2009.05440 (2020). (Year: 2020).*

Halstead, Ben, et al. "Fingerprinting concepts in data streams with supervised and unsupervised meta-information." 2021 IEEE 37th International Conference on Data Engineering (ICDE). IEEE, 2021. (Year: 2021).*

Hardt, Michaela, et al. "Amazon sagemaker clarify: Machine learning bias detection and explainability in the cloud." Proceedings of the 27th ACM SIGKDD conference on knowledge discovery & data mining. 2021. (Year: 2021).*

Jacob, Vincent, et al. "Exathlon: A benchmark for explainable anomaly detection over time series." arXiv preprint arXiv:2010. 05073 (2020). (Year: 2020).*

Shanbhag, Aalok, Avijit Ghosh, and Josh Rubin. "Unified shapley framework to explain prediction drift." arXiv preprint arXiv:2102. 07862 (2021). (Year: 2021).*

Souza, Vinicius MA, et al. "Efficient unsupervised drift detector for fast and high-dimensional data streams." Knowledge and Information Systems 63.6 (2021): 1497-1527. (Year: 2021).*

Stocco, Andrea, and Paolo Tonella. "Confidence-driven weighted retraining for predicting safety-critical failures in autonomous driving systems." Journal of Software: Evolution and Process 34.10 (2022): e2386. (Year: 2022).*

Li, Bin, Chiara Balestra, and Emmanuel Müller. "Enabling the visualization of distributional shift using shapley values." NeurIPS 2022 Workshop on Distribution Shifts: Connecting Methods and Applications. 2022. (Year: 2022).*

Che, Tong, et al. "Deep verifier networks: Verification of deep discriminative models with deep generative models." Proceedings of the AAAI conference on artificial intelligence. vol. 35. No. 8. 2021. (Year: 2021).*

Roshan, Khushnaseeb, and Aasim Zafar. "Using kernel shap xai method to optimize the network anomaly detection model." 2022 9th International Conference on Computing for Sustainable Global Development (INDIACom). IEEE, 2022. (Year: 2022).*

S. M. Piryonesi et al., "Data Analytics in Asset Management: Cost-Effective Prediction of the Pavement Condition Index," Journal of Infrastructure Systems, vol. 26, No. 1, Mar. 1, 2020, 25 pages.

T. Hastie et al., "Boosting and Additive Trees," Chapter 10 in the Elements of Statistical Learning, 2nd Edition, 2009, pp. 337-384.

T. Chen et al., "XGBoost: A Scalable Tree Boosting System," Proceedings of the 22nd ACM SIGKDD International Conference on Knowledge Discovery and Data Mining, Aug. 2016, pp. 785-794.

B. Rozemberczki et al., "The Shapley Value in Machine Learning," arXiv:2202.05594v2, May 26, 2022, 8 pages.

Wikipedia, "k-Means Clustering," https://en.wikipedia.org/wiki/K-means_clustering, Jun. 26, 2022, 11 pages.

Wikipedia, "Shapley Value," https://en.wikipedia.org/wiki/Shapley_value, Jun. 25, 2022, 8 pages.

U.S. Appl. No. 17/857,222 filed in the name of Jiacheng Ni et al. Jul. 5, 2022, and entitled "Method, Electronic Device, and Computer Program Product for Detecting Model Drift."

* cited by examiner

100

200

300

302

Acquire a prediction result of an input feature using a target model to determine a confidence of the prediction result

304

Reconstruct the input feature using a self-coding model to determine a reconstruction error, the reconstruction error being a difference between the input feature before being reconstructed by the self-coding model and the input feature after being reconstructed by the self-coding model

306

Determine a detection result of the target model at least based on a comparison between the confidence and a first threshold and a comparison between the reconstruction error and a second threshold

FIG. 3

METHOD, ELECTRONIC DEVICE, AND COMPUTER PROGRAM PRODUCT FOR DETECTING MODEL PERFORMANCE

RELATED APPLICATION

The present application claims priority to Chinese Patent Application No. 202211295555.4, filed Oct. 21, 2022, and entitled "Method, Electronic Device, and Computer Program Product for Detecting Model Performance," which is incorporated by reference herein in its entirety.

FIELD

Embodiments of the present disclosure relate to the technical field of computers and, more particularly, to a method, an electronic device, and a computer program product for detecting model performance.

BACKGROUND

Deep neural networks have been widely used in various fields. Different from other applications, the performance of a deep neural network model will decrease over time due to changes in the environment (such as user behavior and sensor drift), which results in model drift. The model drift usually means that statistical characteristics of a target variable that the model is trying to predict will change in an unforeseeable way over time. As prediction results of a model become less accurate over time, it will lead to many problems. However, model retraining is usually a time-consuming and laborious project.

SUMMARY

Embodiments of the present disclosure provide a solution for detecting model performance.

In a first aspect of the present disclosure, a method for detecting model performance is provided. The method may include acquiring a prediction result of an input feature using a target model to determine a confidence of the prediction result. The method may further include reconstructing the input feature using a self-coding model to determine a reconstruction error, the reconstruction error being a difference between the input feature before being reconstructed by the self-coding model and the input feature after being reconstructed by the self-coding model. In addition, the method may include determining a detection result of the target model at least based on a comparison between the confidence and a first threshold and a comparison between the reconstruction error and a second threshold.

In a second aspect of the present disclosure, an electronic device is provided, including a processor; and a memory coupled to the processor and having instructions stored therein, wherein the instructions, when executed by the processor, cause the electronic device to perform actions including: acquiring a prediction result of an input feature using a target model to determine a confidence of the prediction result; reconstructing the input feature using a self-coding model to determine a reconstruction error, the reconstruction error being a difference between the input feature before being reconstructed by the self-coding model and the input feature after being reconstructed by the self-coding model; and determining a detection result of the target model at least based on a comparison between the confidence and a first threshold and a comparison between the reconstruction error and a second threshold.

In a third aspect of the present disclosure, a computer program product is provided, wherein the computer program product is tangibly stored on a non-transitory computer-readable medium and includes machine-executable instructions, wherein the machine-executable instructions, when executed by a machine, cause the machine to perform any steps of the method according to the first aspect.

This Summary is provided to introduce the selection of concepts in a simplified form, which will be further described in the Detailed Description below. The Summary is neither intended to identify key features or main features of the present disclosure, nor intended to limit the scope of the present disclosure.

BRIEF DESCRIPTION OF THE DRAWINGS

Example embodiments of the present disclosure are described in more detail with reference to the accompanying drawings, the above and other objectives, features, and advantages of the present disclosure will become more apparent, and identical or similar reference numbers generally represent identical or similar components in the example embodiments of the present disclosure. In the accompanying drawings:

FIG. 3 illustrates a flow chart of a process of detecting model performance according to an embodiment of the present disclosure;

DETAILED DESCRIPTION

Figure 1:
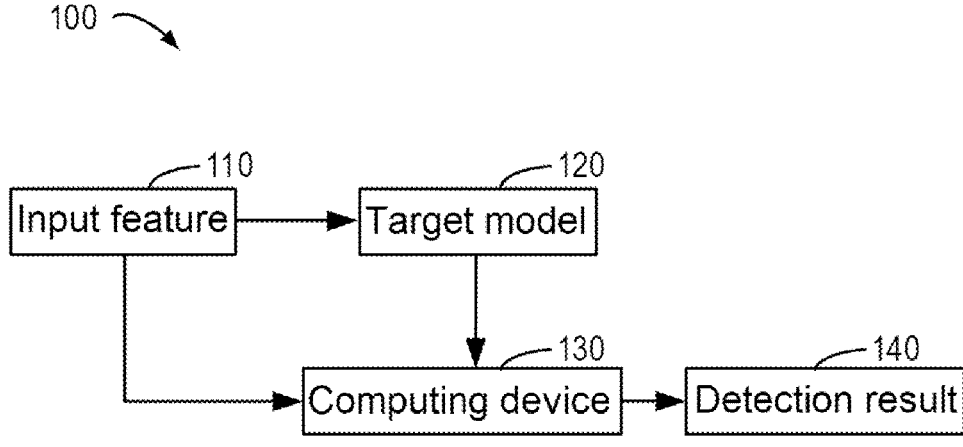
FIG. 1 illustrates a schematic diagram of an example environment according to an embodiment of the present disclosure.

Principles of the present disclosure will be described below with reference to several example embodiments illustrated in the accompanying drawings.

The term "include" and variants thereof used in this text indicate open-ended inclusion, that is, "including but not limited to." Unless specifically stated, the term "or" means "and/or." The term "based on" means "based at least in part on." The terms "an example embodiment" and "an embodiment" indicate "a set of embodiments." The term "another embodiment" indicates "a group of other embodiments." The terms "first," "second," and the like may refer to different or identical objects. Other explicit and implicit definitions may also be included below.

As discussed above, a model drift occurs frequently throughout the life cycle of a deep neural network model. The model drift refers to that the effect of an old model becomes worse over time under the latest features. The model drift can be classified into at least two categories: concept drift and data drift. The concept drift refers to a change in the distribution or definition of labels, while the data drift refers to a change in the distribution of features.

Traditional model drift detection usually relies on confidence information and ground truth derived from model inference. In other words, in the traditional model drift detection, a model may be considered to have a drift only when a large number of prediction results obtained through prediction by the model do not match corresponding ground truths. Apparently, there is a lag in this detection method, and the labor cost is high.

In order to solve, at least in part, the above problem, an embodiment of the present disclosure provides a novel solution for detecting model performance. First, a computing device may provide an input feature related to field data to a target model to be detected, for the target model to determine a confidence of a prediction result. Correspondingly, a self-coding model for monitoring features in the target model may be built in parallel for the target model. The computing device may reconstruct the input feature using the self-coding model to determine a reconstruction error. Therefore, whether the target model has a drift can be determined at least based on a comparison between the confidence and a first threshold and a comparison between the reconstruction error and a second threshold. In addition, the detection process can also detect Shapley value vectors in the target model and the self-coding model. In the above operations, the model is monitored from an inference confidence and the reconstruction error, thus avoiding the dependence on the ground truth, so that a model drift can be found in a timely manner, and a high labor cost will not be generated. In addition, due to the introduction of observation on the Shapley value vectors, internal causes of a model drift can be automatically identified, and a countermeasure can be worked out, which significantly improves the user experience.

FIG. 1 shows a schematic diagram of example environment 100 according to an embodiment of the present disclosure. In example environment 100, a device and/or a process according to an embodiment of the present disclosure may be implemented. Example environment 100 includes input feature 110, target model 120 to be detected, computing device 130, and output detection result 140. Computing device 130 obtains detection result 140, such as whether target model 120 is in a drift state, by means of monitoring input feature 110 and target model 120.

An example of computing device 130 includes, but is not limited to, a personal computer, a server computer, a handheld or laptop device, a mobile device (such as a mobile phone, a personal digital assistant (PDA), and a media player), a multiprocessor system, a consumer electronic product, a small computer, a mainframe computer, a distributed computing environment including any of the above systems or devices, and the like.

In some embodiments, computing device 130 may extract input feature 110 from received input data. The received input data may be voice data, text data, or pictures input by a user. Thus, target model 120 determines a prediction result based on input feature 110 to determine a confidence of the prediction result. Computing device 130 may determine detection result 140 based on input feature 110 and the confidence output by target model 120, so as to remind the user when it is detected that target model 120 is in the drift state, or to recommend a countermeasure that improves the performance of target model 120 to the user.

The above examples are intended to describe the present disclosure only and are not specific limitations to the present disclosure. In order to explain principles of the above solution more clearly, the process for training and applying a model will be described in more detail below with reference to FIG. 2.

Figure 2:
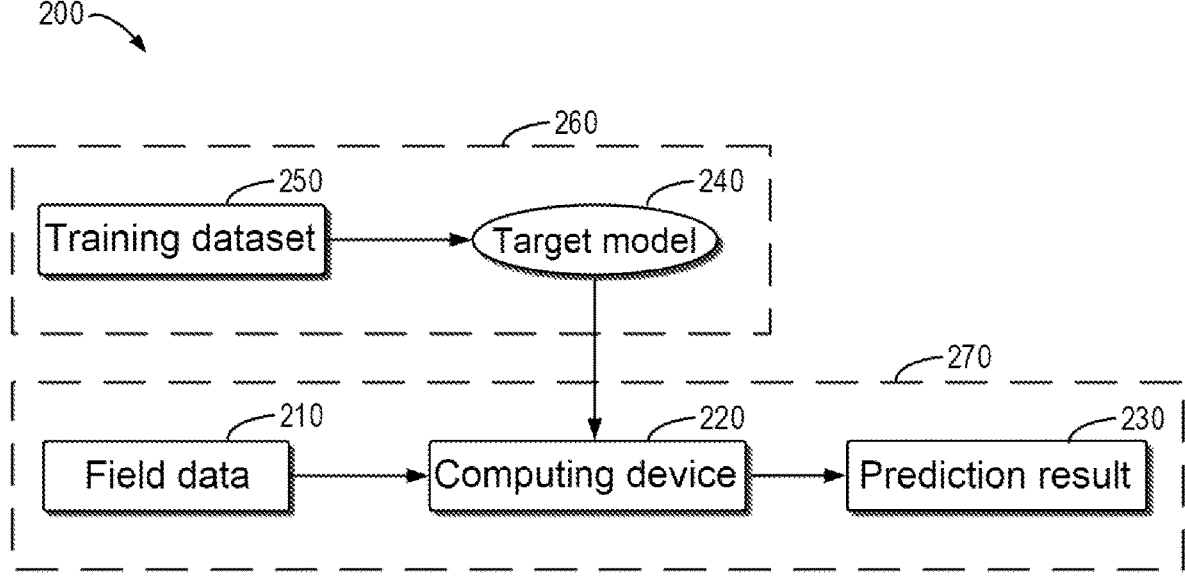
FIG. 2 illustrates a schematic diagram of a detailed example environment for training and applying a model according to an embodiment of the present disclosure.

FIG. 2 illustrates a schematic diagram of detailed example environment 200 for training and applying a model according to an embodiment of the present disclosure. As shown in FIG. 2, example environment 200 may include computing device 220, field data 210 input into computing device 220, and prediction result 230 output from computing device 220 and corresponding to field data 210. Example environment 200 may generally include model training system 260 and model application system 270. As an example, model training system 260 and/or model application system 270 may be implemented in computing device 130 as shown in FIG. 1 or in computing device 220 as shown in FIG. 2. It should be understood that the structure and functions of example environment 200 are described for illustrative purposes only, and are not intended to limit the scope of the subject matter described herein. The subject matter described herein may be implemented in different structures and/or functions.

As mentioned above, the process of processing field data 210 using target model 240 may be divided into two stages: a model training stage and a model application stage. As an example, in the model training stage, model training system 260 can use training dataset 250 to train target model 240 used for performing corresponding functions. It should be understood that training dataset 250 may be a combination of a plurality of pieces of sample data (as an input to target model 240) and corresponding labeled supervision information (or referred to as "label" or "ground truth"). In the model application stage, model application system 270 may receive trained target model 240. Thus, target model 240 loaded into computing device 220 of model application system 270 may determine prediction result 230 based on field data 210.

In other embodiments, target model 240 may be constructed as a learning network. In some embodiments, this learning network may include multiple networks, wherein each of the networks may be a multilayer neural network that may be constituted by a large number of neurons. Through the training process, corresponding parameters of the neurons in each of the networks can be determined. Parameters of the neurons in these networks are collectively referred to as parameters of target model 240.

The training process of target model 240 may be performed in an iterative manner until at least some of the parameters of target model 240 converge or until a predetermined number of iterations is performed, thereby obtaining final model parameters.

The technical solution described above is only used as an example, and does not limit the present disclosure. It should be understood that the networks may also be disposed according to other manners and connection relationships. In order to explain principles of the above solution more clearly, the process for detecting model performance will be described in more detail below with reference to FIG. 3.

The process for detecting model performance according to an embodiment of the present disclosure will be described in detail below with reference to FIG. 3. For ease of understanding, specific data mentioned in the following description is illustrative and is not intended to limit the protection scope of the present disclosure. It should be understood that embodiments described below may also include additional actions not shown and/or may omit actions shown, and the scope of the present disclosure is not limited in this regard.

FIG. 3 illustrates a flow chart of process 300 of detecting model performance according to an embodiment of the present disclosure. Process 300 for detecting the performance of a target model according to an embodiment of the present disclosure is now described with reference to FIG. 3. For ease of understanding, specific examples mentioned in the following description are illustrative and are not intended to limit the protection scope of the present disclosure.

As shown in FIG. 3, at 302, computing device 130 may acquire a prediction result of input feature 110 using target model 120 to determine a confidence of the prediction result. In some embodiments, when target model 120 is a deep neural network model, the confidence of the prediction result inferred by target model 120 can be determined based on the distribution of scores output by the model. It should be understood that a high confidence of model inference may usually indicate that the model has been fully trained, while a low confidence of model inference may usually indicate that the model is insufficiently trained.

At 304, computing device 130 may reconstruct the input feature using the self-coding model to determine a reconstruction error. It should be understood that the reconstruction error is a difference between the input feature before being reconstructed by the self-coding model and the input feature after being reconstructed by the self-coding model. The self-coding model is an unsupervised neural network model, which can learn implicit features of input data. This is referred to as coding. At the same time, original input data can be reconstructed using the new features learned. This is referred to as decoding. It should be understood that a small reconstruction error indicates that the input data is included in the training dataset, while a large reconstruction error indicates that the input data is not included in the training dataset.

At 306, computing device 130 may determine detection result 140 of target model 120 at least based on a comparison between the confidence and a first threshold and a comparison between the reconstruction error and a second threshold. In this way, the dependency on the ground truth is avoided, so that a model drift can be found in a timely manner.

Figure 4:
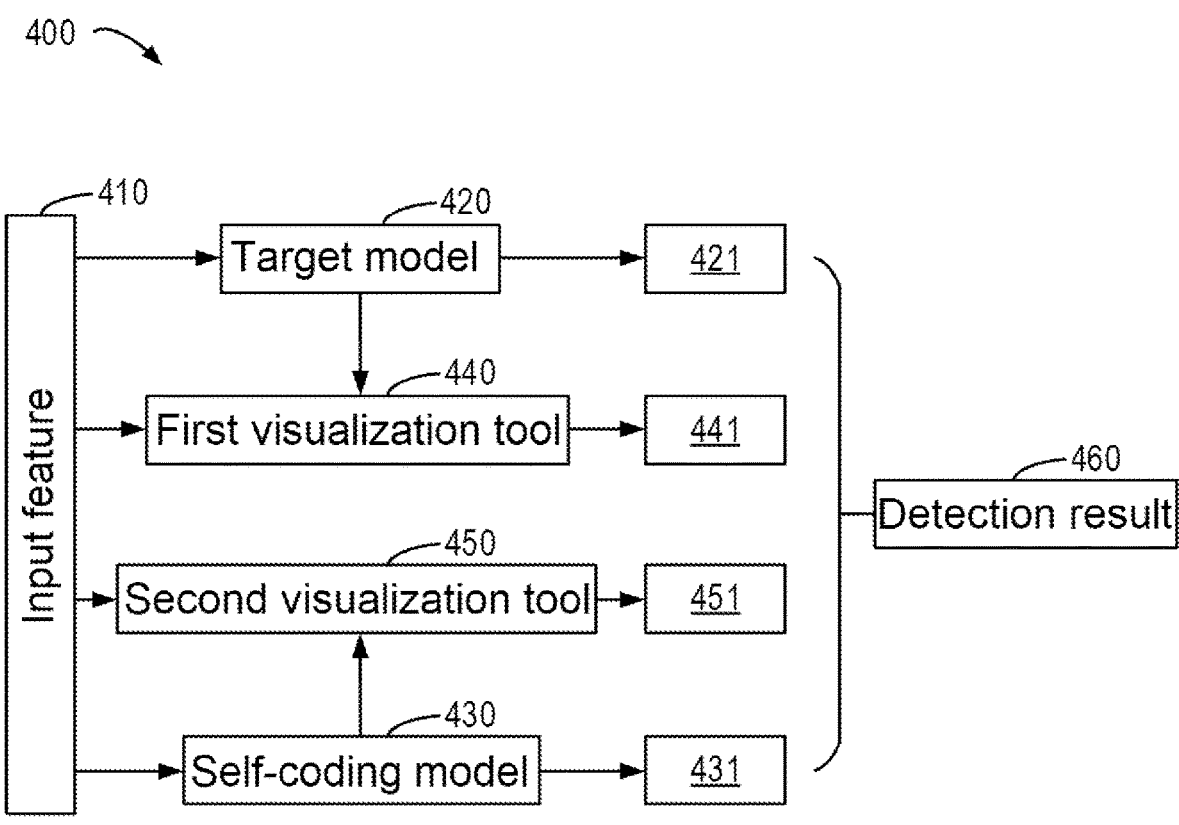
FIG. 4 illustrates a schematic diagram of an overall architecture of a detection result for determining model performance according to an embodiment of the present disclosure.

FIG. 4 illustrates a schematic diagram of overall architecture 400 of a detection result for determining model performance according to an embodiment of the present disclosure.

As shown in FIG. 4, confidence 421 of the prediction result can be determined based on input feature 410 with target model 420. At the same time, first Shapley value vector 441 can be determined based on input feature 410 and target model 420 with first visualization tool 440. It should be understood that first visualization tool 440 can be a model visualization tool such as DeepSHAP. For example, the importance of each feature of input features x in target model 420 can be determined with the DeepSHAP. These values can form Shapley value vector DeepSHAP(x)$_{dnn}$, that is, first Shapley value vector 441.

Correspondingly or in parallel, reconstruction error 431 can be determined based on input feature 410 with self-coding model 430. At the same time, second Shapley value vector 451 can be determined based on input feature 410 and self-coding model 430 with second visualization tool 450.

Figure 5:
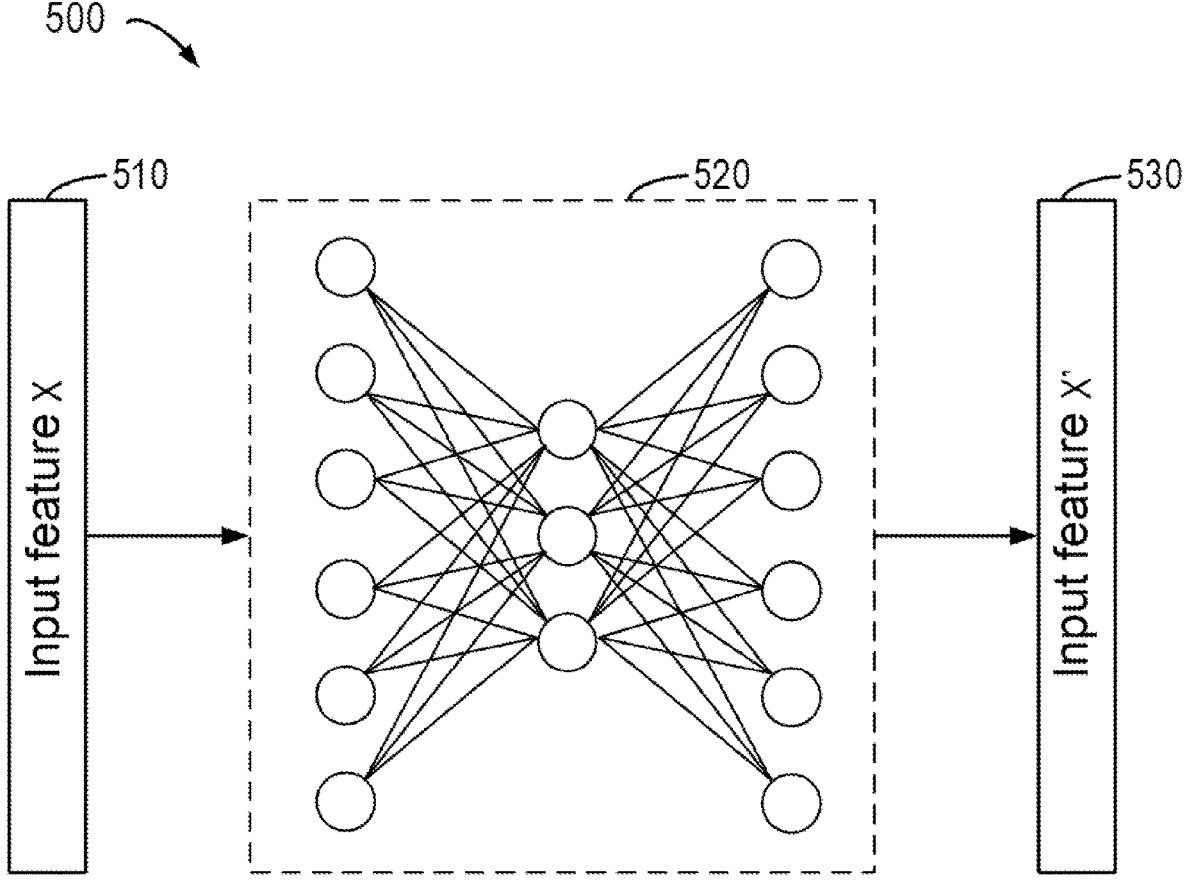
FIG. 5 illustrates a schematic diagram of an example scenario of a self-coding model according to an embodiment of the present disclosure.

FIG. 5 illustrates a schematic diagram of example scenario 500 of a self-coding model according to an embodiment of the present disclosure. As shown in FIG. 5, self-coding model 520 is trained to be able to reconstruct input data. For example, input feature X 510 of the input data is provided to self-coding model 520. Self-coding model 520 performs down-sampling on the input feature X through a coding process, and reconstructs input feature X' 530 through a decoding process. When the input feature is normal, a difference (i.e. the reconstruction error) between the reconstructed input feature X' and the input feature X will be small enough. Thus, self-coding model 520 can be constructed to monitor input feature 410 in target model 420 in FIG. 4.

Returning back to FIG. 4, it should be understood that second visualization tool 450 can be the same as first visualization tool 440. For example, the importance of each feature of input features x in self-coding model 430 can be determined with the DeepSHAP. These values can form Shapley value vector DeepSHAP(x)$_{ae}$, that is, second Shapley value vector 451.

Finally, computing device 130 may determine detection result 460 based on confidence 421, first Shapley value vector 441, reconstruction error 431, and second Shapley value vector 451.

In some embodiments, when the confidence is greater than the first threshold and the reconstruction error is less than the second threshold, computing device 130 may determine detection result 140 as being normal. In other words, when target model 120 has been fully trained and the input data in the field is included in the training dataset for training target model 120, it can be determined that target model 120 does not have a model drift, so target model 120 can continue to be used normally.

In some embodiments, assuming that a ground truth of the input data in the field can be obtained by means of sampling or in other ways, when the confidence is greater than the first threshold, the reconstruction error is less than the second threshold, and a difference between the prediction result and the ground truth exceeds a predetermined range, computing device 130 can determine detection result 140 as a concept drift. It should be understood that the concept drift is usually caused by a change in the environment, so there will be deviations in the prediction result. For example, a plurality of film and television works related to a famous person can be usually obtained after the name of the famous person is entered. However, if the famous person is involved in a certain specific event of great current interest, an output result will become the event, causing a drift. When it is determined that target model 120 has a drift, computing device 130 may further retrain target model 120 on a training dataset that is different from a training dataset which was used for training target model 120.

In some embodiments, when the confidence is less than the first threshold and the reconstruction error is less than the second threshold, computing device 130 can determine that detection result 140 indicates target model 120 being under fitted. When it is determined that target model 120 is under fitted, computing device 130 may decrease a learning rate for training the target model, and retrain target model 120 on the training dataset for training target model 120 using the decreased learning rate.

In some embodiments, when the confidence is less than the first threshold and the reconstruction error is greater than the second threshold, computing device 130 may determine that detection result 140 indicates appearance of a new feature pattern. For example, in the application of a face recognition model, new face data appears. When it is determined that the new feature pattern appears in target model 120, computing device 130 can further determine the new feature pattern based on the second Shapley value vector, and incrementally train target model 120 on a new training dataset that conforms to the new feature pattern. Since the Shapley value vector can determine features with high importance in the new feature pattern, the training data that conforms to the new feature pattern can be purposefully prepared.

In some embodiments, when the confidence is greater than the first threshold and the reconstruction error is greater than the second threshold, if a similarity between the first Shapley value vector and the second Shapley value vector is greater than a third threshold, it means that features that cause an abnormality also contribute to high confidence inference. At this time, computing device 130 can determine the detection result as a concept drift. Furthermore, computing device 130 may further retrain target model 120 on a training dataset that is different from the training dataset which was used for training target model 120. However, if the similarity between the first Shapley value vector and the second Shapley value vector is less than the third threshold, the features that cause the abnormality will not contribute to the high confidence inference. At this time, computing device 130 can determine the detection result as being undetermined. At this time, no measures may be taken, and the model performance is further observed.

Through the above embodiments, the performance of the model can be detected and monitored without a ground truth. Thus, the model drift can be automatically detected throughout the life cycle of the model. In addition, due to the Shapley value vector introduced in the present disclosure, diagnostic opinions and further model updating policies can be provided when the model performance is low. These operations may not increase the labor cost, so the user experience is significantly improved.

Figure 6:
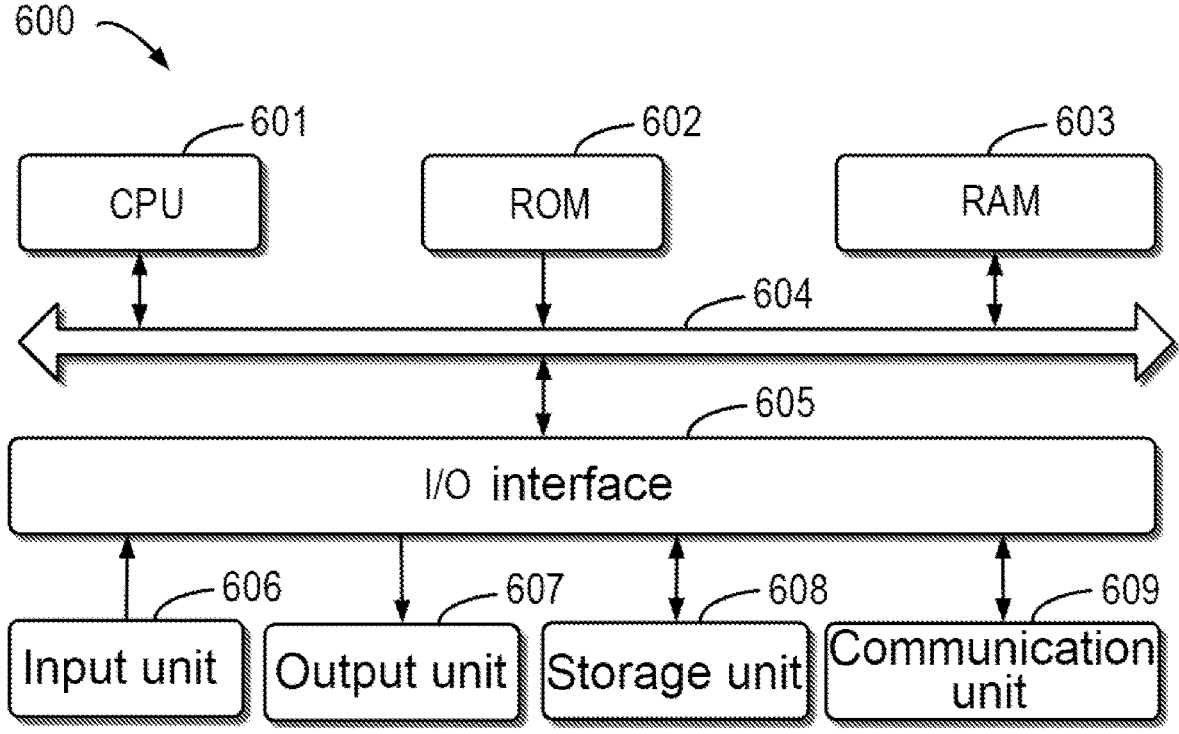
FIG. 6 illustrates a block diagram of an example device that may be used to implement embodiments of the present disclosure.

FIG. 6 is a block diagram of example device 600 that may be configured to implement embodiments of the present disclosure. For example, device 600 may be configured to implement computing device 130 as shown in FIG. 1. As shown in the drawing, device 600 includes a central processing unit (CPU) 601 that may perform various appropriate actions and processing according to computer program instructions stored in read-only memory (ROM) 602 or computer program instructions loaded from storage unit 608 into random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network, such as the Internet, and/or various telecommunication networks.

CPU 601 performs the various methods and processing described above, such as process 300. For example, in some embodiments, the various methods and processing described above may be implemented as a computer software program or a computer program product, which is tangibly included in a machine-readable medium, such as storage unit 608. In some embodiments, part of or all the computer program may be loaded and/or installed onto device 600 via ROM 602 and/or communication unit 609. When the computer program is loaded into RAM 603 and executed by CPU 601, one or a plurality of steps of any process described above may be implemented. Alternatively, in other embodiments, CPU 601 may be configured in any other suitable manners (for example, by means of firmware) to perform a process such as process 300.

Embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, any non-transitory storage device, or any appropriate combination described above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The foregoing description is illustrative rather than exhaustive, and is not limited to the disclosed various embodiments. Numerous modifications and alterations will be apparent to persons of ordinary skill in the art without departing from the scope and spirit of the illustrated embodiments. The selection of terms used herein is intended to best explain the principles and practical applications of the embodiments and their associated improvements, so as to enable persons of ordinary skill in the art to understand the embodiments disclosed herein.

What is claimed is:

1. A method, comprising:

acquiring a prediction result of an input feature using a target model to determine a confidence of the prediction result, the target model comprising a first neural network of a processor-based machine learning system, the first neural network having an input adapted to receive the input feature and an output providing the prediction result of the input feature;

reconstructing the input feature using a self-coding model to determine a reconstruction error, the reconstruction error being a difference between the input feature before being reconstructed by the self-coding model and the input feature after being reconstructed by the self-coding model, wherein the self-coding model comprises a second neural network of the processor-based machine learning system, different than the first neural network, the second neural network being arranged in parallel with the first neural network and comprising a coder coupled to a decoder, the coder having an input adapted to receive the input feature and an output coupled to an input of the decoder, the decoder having an output providing the reconstruction error for the input feature;

determining, the processor-based machine learning system, a detection result of the target model at least based on a comparison between the confidence and a first threshold and a comparison between the reconstruction error and a second threshold; and controlling training of the target model in the processor-based machine learning system based on the detection result.

2. The method according to claim 1, wherein determining the detection result comprises:

determining the detection result as being normal in response to that the confidence is greater than the first threshold and the reconstruction error is less than the second threshold.

3. The method according to claim 1, wherein determining the detection result comprises:

determining the detection result as a concept drift in response to that the confidence is greater than the first threshold, the reconstruction error is less than the second threshold, and the difference between the prediction result and a ground truth exceeds a predetermined range; and wherein the method further comprises:

retraining the target model on a training dataset that is different from a training dataset which was used for training the target model.

4. The method according to claim 1, wherein determining the detection result comprises:

determining, in response to that the confidence is less than the first threshold and the reconstruction error is less than the second threshold, that the detection result indicates the target model being under fitted, and wherein the method further comprises:

decreasing a learning rate for training the target model; and retraining the target model on a training dataset for training the target model at the decreased learning rate.

5. The method according to claim 1, further comprising:

determining a first Shapley value vector of the target model based on the input feature and the target model; and determining a second Shapley value vector of the self-coding model based on the input feature and the self-coding model.

6. The method according to claim 5, wherein determining the detection result comprises:

determining, in response to that the confidence is less than the first threshold and the reconstruction error is greater than the second threshold, that the detection result indicates appearance of a new feature pattern, and wherein the method further comprises:

determining the new feature pattern based on the second Shapley value vector; and incrementally training the target model on a training dataset that conforms to the new feature pattern.

7. The method according to claim 5, wherein determining the detection result comprises:

when a similarity between the first Shapley value vector and the second Shapley value vector is greater than a third threshold, determining the detection result as a concept drift in response to that the confidence is greater than the first threshold and the reconstruction error is greater than the second threshold, and wherein the method further comprises:

retraining the target model on a training dataset that is different from a training dataset which was used for training the target model.

8. The method according to claim 7, wherein determining the detection result further comprises:

determining the detection result as being undetermined when the similarity between the first Shapley value vector and the second Shapley value vector is less than the third threshold.

9. The method according to claim 5, wherein the first Shapley value vector and the second Shapley value vector are both determined with a model visualization tool.

10. An electronic device, comprising:

at least one processor; and memory coupled to the at least one processor and having instructions stored therein, wherein the instructions, when executed by the at least one processor, cause the electronic device to perform actions comprising:

acquiring a prediction result of an input feature using a target model to determine a confidence of the prediction result, the target model comprising a first neural network of a processor-based machine learning system, the first neural network having an input adapted to receive the input feature and an output providing the prediction result of the input feature;

reconstructing the input feature using a self-coding model to determine a reconstruction error, the reconstruction error being a difference between the input feature before being reconstructed by the self-coding model and the input feature after being reconstructed by the self-coding model, wherein the self-coding model comprises a second neural network of the processor-based machine learning system, different than the first neural network, the second neural network being arranged in parallel with the first neural network and comprising a coder coupled to a decoder, the coder having an input adapted to receive the input feature and an output coupled to an input of the decoder, the decoder having an output providing the reconstruction error for the input feature;

determining, the processor-based machine learning system, a detection result of the target model at least based on a comparison between the confidence and a first threshold and a comparison between the reconstruction error and a second threshold; and controlling training of the target model in the processor-based machine learning system based on the detection result.

11. The electronic device according to claim 10, wherein determining the detection result comprises:

determining the detection result as being normal in response to that the confidence is greater than the first threshold and the reconstruction error is less than the second threshold.

12. The electronic device according to claim 10, wherein determining the detection result comprises:

determining the detection result as a concept drift in response to that the confidence is greater than the first threshold, the reconstruction error is less than the second threshold, and the difference between the prediction result and a ground truth exceeds a predetermined range; and wherein the actions further comprise:

retraining the target model on a training dataset that is different from a training dataset which was used for training the target model.

13. The electronic device according to claim 10, wherein determining the detection result comprises:

determining, in response to that the confidence is less than the first threshold and the reconstruction error is less than the second threshold, that the detection result indicates the target model being under fitted, and wherein the actions further comprise:

decreasing a learning rate for training the target model; and retraining the target model on a training dataset for training the target model at the decreased learning rate.

14. The electronic device according to claim 10, wherein the actions further comprise:

determining a first Shapley value vector of the target model based on the input feature and the target model; and determining a second Shapley value vector of the self-coding model based on the input feature and the self-coding model.

15. The electronic device according to claim 14, wherein determining the detection result comprises:

determining, in response to that the confidence is less than the first threshold and the reconstruction error is greater than the second threshold, that the detection result indicates appearance of a new feature pattern, and wherein the actions further comprise:

determining the new feature pattern based on the second Shapley value vector; and incrementally training the target model on a training dataset that conforms to the new feature pattern.

16. The electronic device according to claim 14, wherein determining the detection result comprises:

when a similarity between the first Shapley value vector and the second Shapley value vector is greater than a third threshold, determining the detection result as a concept drift in response to that the confidence is greater than the first threshold and the reconstruction error is greater than the second threshold, and wherein the actions further comprise:

retraining the target model on a training dataset that is different from a training dataset which was used for training the target model.

17. The electronic device according to claim 16, wherein determining the detection result further comprises:

determining the detection result as being undetermined when the similarity between the first Shapley value vector and the second Shapley value vector is less than the third threshold.

18. The electronic device according to claim 14, wherein the first Shapley value vector and the second Shapley value vector are both determined with a model visualization tool.

19. A computer program product comprising a non-transitory computer-readable medium having machine-executable instructions stored therein, wherein the machine-executable instructions, when executed by a machine, cause the machine to perform actions comprising:

acquiring a prediction result of an input feature using a target model to determine a confidence of the prediction result, the target model comprising a first neural network of a processor-based machine learning system, the first neural network having an input adapted to receive the input feature and an output providing the prediction result of the input feature;

reconstructing the input feature using a self-coding model to determine a reconstruction error, the reconstruction error being a difference between the input feature before being reconstructed by the self-coding model and the input feature after being reconstructed by the self-coding model, wherein the self-coding model comprises a second neural network of the processor-based machine learning system, different than the first neural network, the second neural network being arranged in parallel with the first neural network and comprising a coder coupled to a decoder, the coder having an input adapted to receive the input feature and an output coupled to an input of the decoder, the decoder having an output providing the reconstruction error for the input feature;

determining, the processor-based machine learning system, a detection result of the target model at least based on a comparison between the confidence and a first threshold and a comparison between the reconstruction error and a second threshold; and controlling training of the target model in the processor-based machine learning system based on the detection result.

20. The computer program product according to claim 19, wherein determining the detection result comprises:

determining the detection result as being normal in response to that the confidence is greater than the first threshold and the reconstruction error is less than the second threshold.

* * * * *